(12) United States Patent
Koh et al.

(10) Patent No.: US 8,118,218 B2
(45) Date of Patent: Feb. 21, 2012

(54) METHOD AND APPARATUS FOR PROVIDING ELECTRONIC PURSE

(75) Inventors: Liang Seng Koh, Fremont, CA (US); Futong Cho, Milpitas, CA (US); Hsin Pan, Fremont, CA (US); Fuliang Cho, San Jose, CA (US)

(73) Assignees: Rich House Global Technology Ltd., Shenzhen (CN); RFCyber Corp., Fremont, CA (US)

( * ) Notice: Subject to any disclaimer, the term of this patent is extended or adjusted under 35 U.S.C. 154(b) by 1057 days.

(21) Appl. No.: 11/534,653

(22) Filed: Sep. 24, 2006

(65) Prior Publication Data
US 2008/0073426 A1   Mar. 27, 2008

(51) Int. Cl.
*G06K 5/00* (2006.01)
(52) U.S. Cl. .......... 235/380; 235/451; 235/492; 705/26; 705/39; 705/40; 705/41; 705/64
(58) Field of Classification Search .................. 235/379, 235/380, 492
See application file for complete search history.

(56) References Cited

U.S. PATENT DOCUMENTS
| 6,607,136 B1 * | 8/2003 | Atsmon et al. ............... 235/492 |
| 2002/0145632 A1 * | 10/2002 | Shmueli et al. ............... 345/835 |
| 2009/0313689 A1 * | 12/2009 | Nystrom et al. ................. 726/9 |

FOREIGN PATENT DOCUMENTS
WO    WO 2007068991 A1 *   6/2007

* cited by examiner

*Primary Examiner* — Thien M. Le
*Assistant Examiner* — Christopher Stanford
(74) *Attorney, Agent, or Firm* — Joe Zheng (57) ABSTRACT

Techniques for portable devices functioning as an electronic purse (e-purse) are disclosed. According to one aspect of the invention, a mechanism is provided to enable a portable device to conduct transactions over an open network with a payment server without compromising security. In one embodiment, a device is loaded with an e-purse manager. The e-purse manager is configured to manage various transactions and functions as a mechanism to access an emulator therein. The transactions may be conducted over a wired network or a wireless network. A three-tier security model is contemplated to support the security of the transactions from the e-purse. The three-tier security model includes a physical security, an e-purse security and a card manager security, concentrically encapsulating one with another. Security keys (either symmetric or asymmetric) are personalized within the three-tier security model.

18 Claims, 9 Drawing Sheets

METHOD AND APPARATUS FOR PROVIDING ELECTRONIC PURSE

BACKGROUND

1. Technical Field

The present invention is generally related to commerce over networks. Particularly, the present invention is related to electronic purses that can be advantageously used in portable devices configured for both electronic commerce (a.k.a., e-commerce) and mobile commerce (a.k.a., m-commerce).

2. Description of the Related Art

Single functional cards have been successfully used in enclosed environments such as transportation systems. One example of such single functional cards is MIFARE that is the most widely installed contactless smart card technology in the world. With more than 500 million smart card ICs and 5 million reader components sold, MIFARE has been selected as the most successful contactless smart card technology. MIFARE is the perfect solution for applications like loyalty and vending cards, road tolling, city cards, access control and gaming.

It is noticed that such enclosed systems are difficult to be expanded into other areas such as e-commerce and m-commerce because stored values and transaction information are stored in data storage of each tag that is protected by a set of keys. The nature of the tag is that the keys need to be delivered to the card for authentication before data can be accessed during a transaction. This constraint makes systems using such technology difficult to be expanded to an open environment such as the Internet for e-commerce and cellular networks for m-commerce as the key delivery over a public domain network causes security concerns.

There is, thus, a need for a mechanism in devices, especially portable devices, functioning as an electronic purse (e-purse) to be able to conduct transactions over an open network with a payment server without compromising security.

SUMMARY

This section is for the purpose of summarizing some aspects of embodiments of the present invention and to briefly introduce some preferred embodiments. Simplifications or omissions in this section as well as the title and the abstract of this disclosure may be made to avoid obscuring the purpose of the section, the title and the abstract. Such simplifications or omissions are not intended to limit the scope of the present invention.

Broadly speaking, the invention is related to a mechanism provided to devices, especially portable devices, functioning as an electronic purse (e-purse) to be able to conduct transactions over an open network with a payment server without compromising security. According to one aspect of the present invention, a device is loaded with an e-purse manager. The e-purse manager is configured to manage various transactions and functions as a mechanism to access an emulator therein. The transactions may be conducted over a wired network or a wireless network.

According to another aspect of the present invention, a three-tier security model is proposed, based on which the present invention is contemplated to operate. The three-tier security model includes a physical security, an e-purse security and a card manager security, concentrically encapsulating one with another. Security keys (either symmetric or asymmetric) are personalized within the three-tier security model so as to personalize an e-purse and perform secured transaction with a payment server. In one embodiment, the essential data to be personalized into an e-purse include one or more operation keys (e.g., a load key and a purchase key), default PINs, administration keys (e.g., an unblock PIN key and a reload PIN key), and passwords (e.g., from Mifare). During a transaction, the security keys are used to establish a secured channel between an embedded e-purse and an SAM (Security Authentication Module) or backend server.

The invention may be implemented in numerous ways, including a method, system, and device. In one embodiment, the present invention is a method for providing an e-purse, the method comprises providing a portable device embedded with a smart card module pre-loaded with an emulator, the portable device including a memory space loaded with a midlet that is configured to facilitate communication between an e-purse applet therein and a payment server over a wireless network, wherein the portable device further includes a contactless interface that facilitates communication between the e-purse applet therein and the payment server, and personalizing the e-purse applet by reading off data from the smart card to generate one or more operation keys that are subsequently used to establish a secured channel between the e-purse and a SAM or a payment server.

According to another embodiment, the present invention is a system for providing an e-purse, the system comprises a portable device embedded with a smart card module pre-loaded with an emulator, the portable device including a memory space loaded with a midlet that is configured to facilitate wireless communication between an e-purse applet therein and a payment server over a wireless network, the portable device further including a contactless interface that facilitates communication between the e-purse applet therein and the payment server, the payment server associated with an issuer of the e-purse, and a SAM module configured to enable the e-purse, wherein the SAM module is behind the payment server when the e-purse is caused to communicate with the payment server via the midlet over a wireless network (M-commerce in FIG. 2) or via the agent on a PC over a wired network (E-commerce in FIG. 2).

Accordingly one of the objects of the present inventions is to provide a mechanism to be embedded in devices, especially portable devices, to function as an electronic purse (e-purse) to be able to conduct transactions over an open network with a payment server without compromising security.

Other objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments do not inherently indicate any particular order nor imply limitations in the invention.

Embodiments of the present invention are discussed herein with reference to FIGS. 1A-4C. However, those skilled in the art will readily appreciate that the detailed description given herein with respect to these figures is for explanatory purposes only as the invention extends beyond these limited embodiments.

Figure 1A:
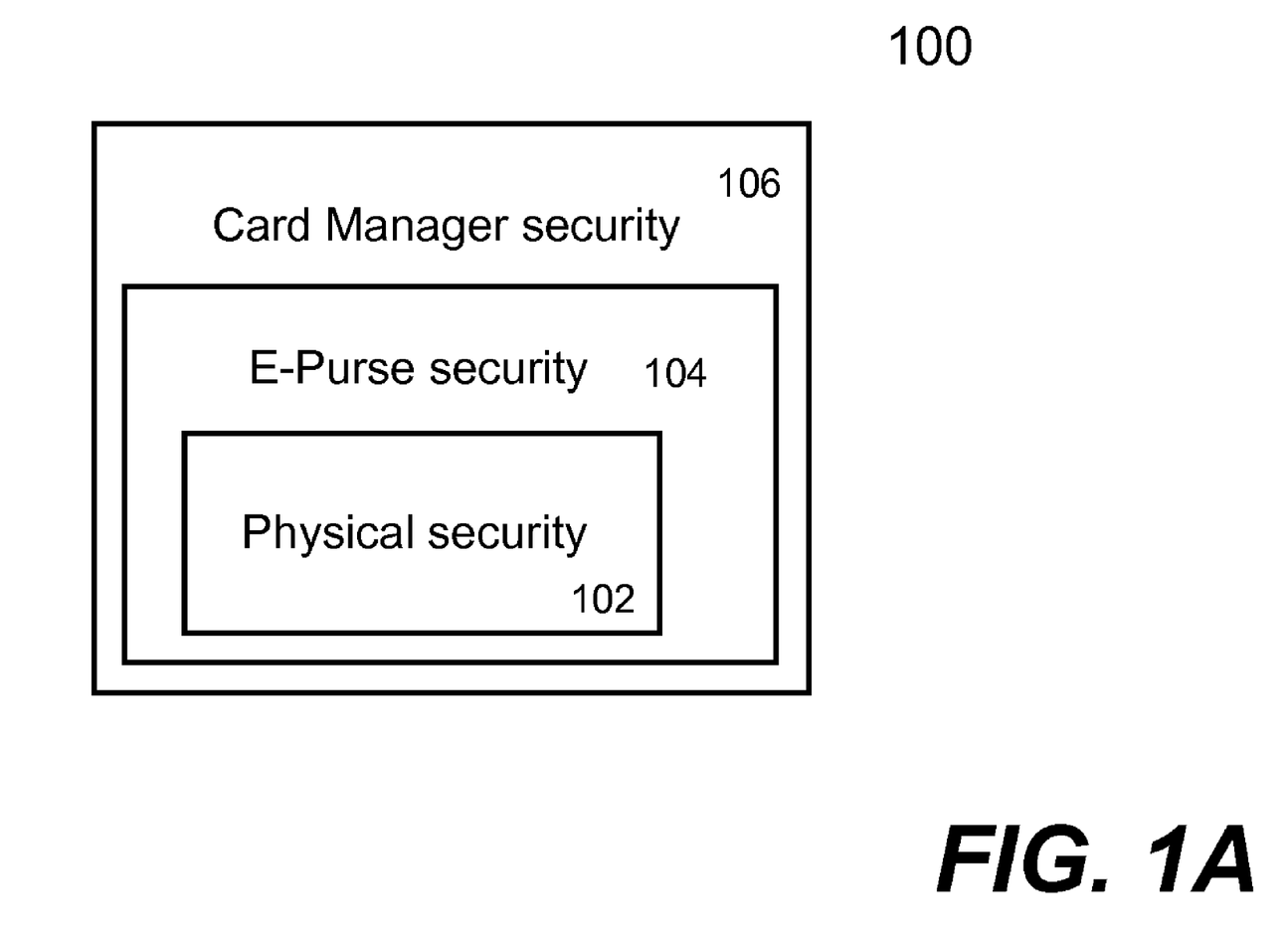
FIG. 1A shows a three-tier security model based on which the present invention is contemplated to operate according to one embodiment thereof.

FIG. 1A shows a three-tier security model 100 based on which the present invention is contemplated to operate according to one embodiment thereof. The three-tier security model 100 includes physical security 102, e-purse security 104 and card manager security 106.

Physical security 102 refers to a security mechanism provided by a single functional card to protect data stored on the card. The card may be hardware implemented or software emulated running on a type of media. Data on a single function card is protected by a set of access keys. These keys are configured onto the card when the card is issued. To avoid obscuring aspects of the present invention, the process of how the keys are configured onto the cards is to be omitted. For accessing the data, related keys are delivered to a reader for authentication.

E-purse security 104 defines a set of protocols that enable micro payment transactions to be carried out in both wired and wireless environments. With an electronic purse (a.k.a., e-purse) stored on a smart card, a set of keys (either symmetric or asymmetric) is personalized into the purse when the purse is being issued. During a transaction, the purse uses a set of respective keys for encryption and MAC computation in order to secure the message channel between the purse and the SAM or backend servers. For a single functional card, the e-purse security 104 will act as gates to protect actual operations performed on a single functional card. During personalization, the single functional card access keys (or its transformation) are personalized into the purse with the purse transaction keys.

Card Manager Security 106, referring to a general security framework of a preload operating system in a smart card, provides a platform for PIN management and security channels (security domains) for card personalization. This platform via a card manager can be used to personalize a purse in one embodiment. One example of the card manager security 106 is what is referred to as a Global Platform (GP) that is created by a cross-industry membership organization to advance standards for smart card growth. A GP combines the interests of smart card issuers, vendors, industry groups, public entities and technology companies to define requirements and technology standards for multiple application smart cards. In one embodiment, a global platform security is used to personalize a smart card. As a result, both e-purse keys and card access keys are personalized into the target tag.

Figure 1B:
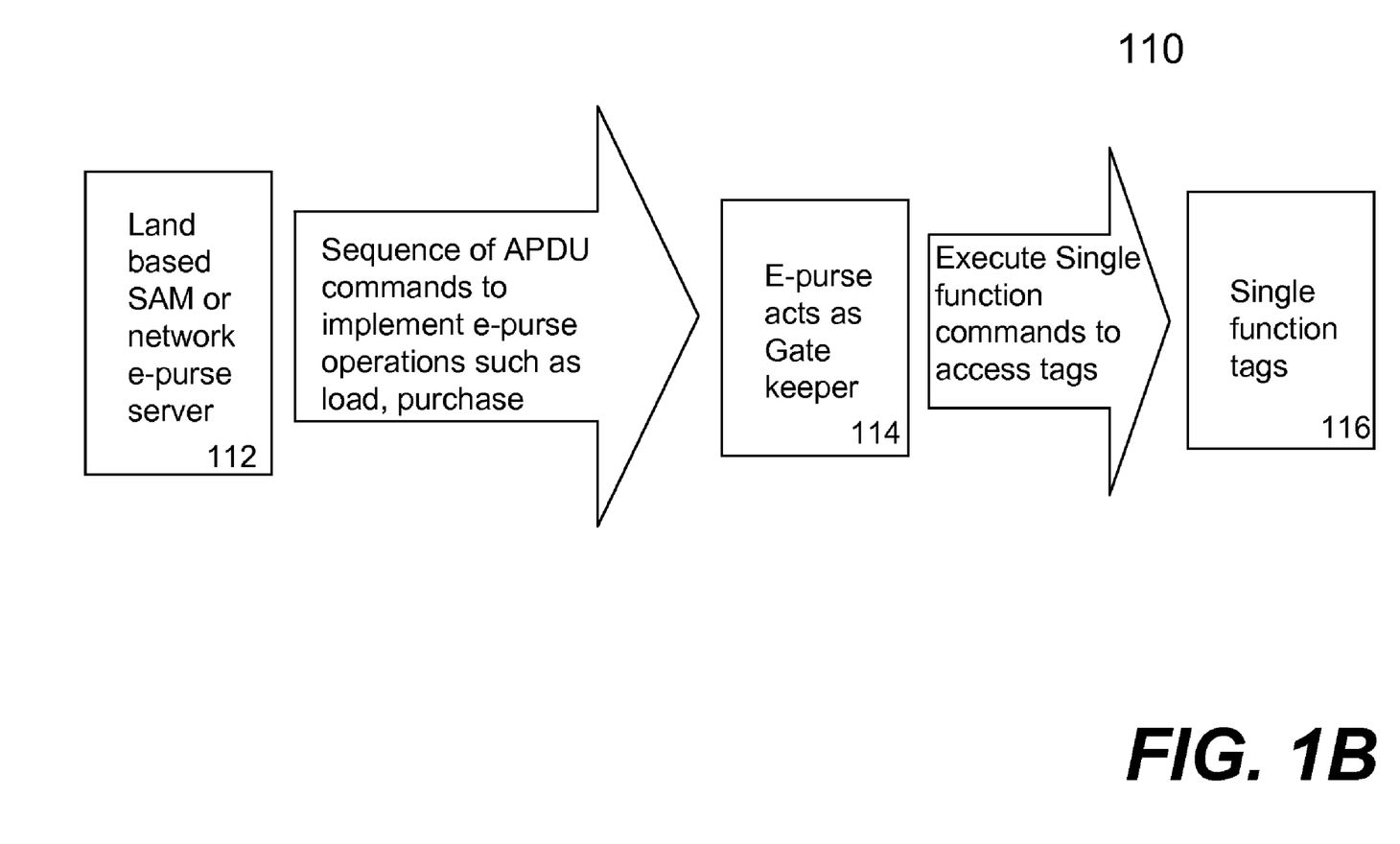
FIG. 1B shows a data flow in accordance with the three-tier security model among three entities.

FIG. 1B shows a data flow in accordance with the three-tier security model among three entities a land-based SAM or a network e-purse server 112, e-purse 114 acting as a gate keeper, and a single function tag 116. According to one embodiment of the present invention, communications between the land-based SAM or the network e-purse server 112 and the e-purse 114 are conducted in sequence of a type of commands (e.g., APDU) while communications between the e-purse 114 and the single function tag 116 are conducted in sequence of another type of commands, wherein the e-purse 114 acts as the gate keeper to ensure only secured and authorized data transactions could happen.

In reference to FIG. 1A, the physical security is realized in an emulator. As used herein, an emulator means a hardware device or a program that pretends to be another particular device or program that other components expect to interact with. The e-purse security is realized between one or more applets configured to provide e-purse functioning and a payment server. The card manager security (e.g., global platform security) is realized via a card manager to update security keys to establish appropriate channels for interactions between the server and the applets, wherein the e-purse applet(s) acts as a gatekeeper to regulate or control the data exchange.

According to one embodiment, a smart card has a preloaded smart card operation system that provides security framework to control the access to the smart card (e.g., an installation of external applications into the smart card). In order to manage the life cycle of an external application, a card manager module is configured by using the smart card security framework. For instance, a Java based smart card, SmartMX, is preloaded with an operating system JCOP 4.1. The Global Platform 2.1 installed on the SmartMX performs the card manager functionality.

Figure 2:
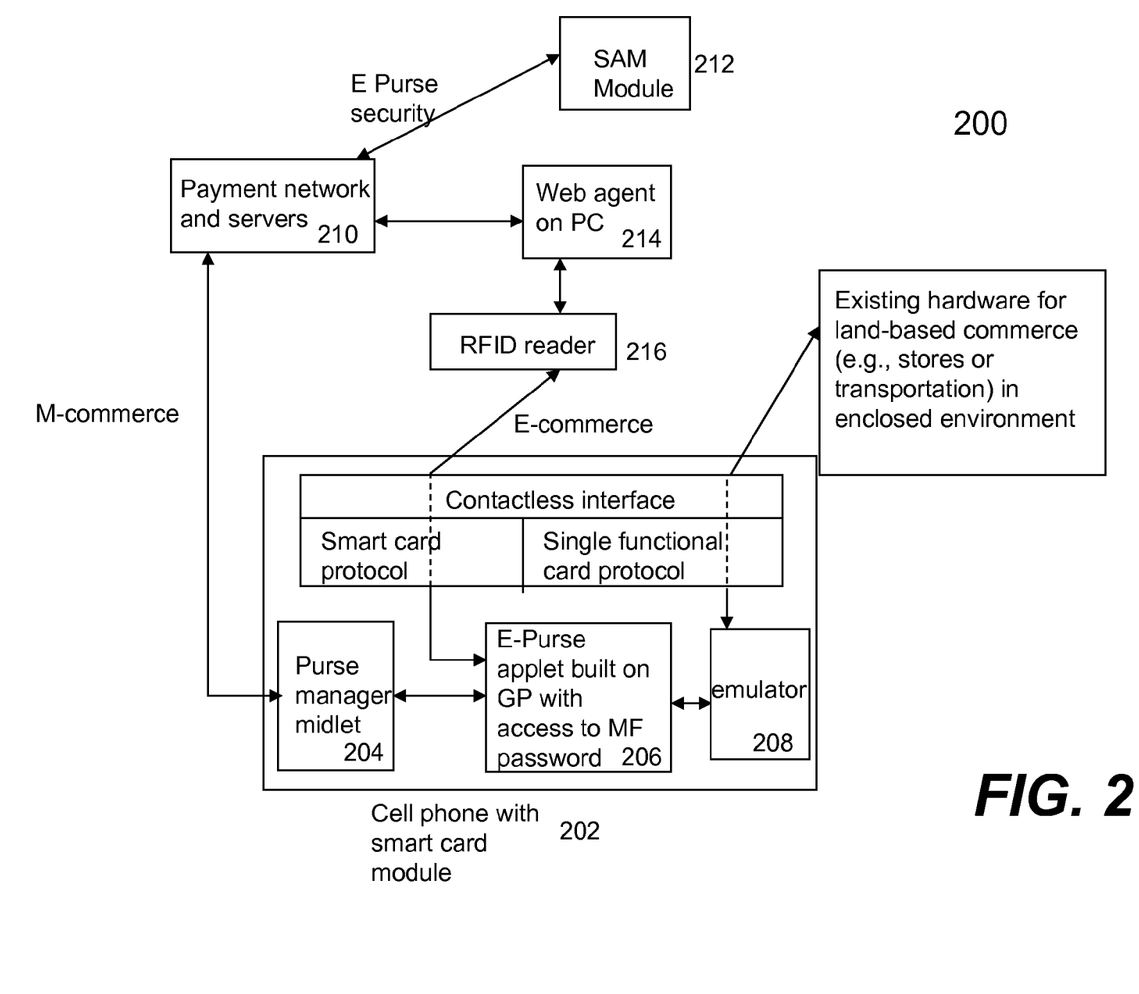
FIG. 2 shows an exemplary architecture diagram according to one embodiment of the present invention.

Referring now to FIG. 2, there shows an exemplary architecture diagram 200 according to one embodiment of the present invention. The diagram 200 includes a cellphone 202 embedded with a smart card module. An example of such a cell phone is a near field communication (NFC) enabled cellphone that includes a Smart MX (SMX) module. The SMX is pre-loaded with a Mifare emulator 208 (which is a single functional card) for storing values. The cellphone is equipped with a RFID interface (e.g., ISO 144443) that allows the cellphone to act as a tag. In addition, the SMX is a JavaCard that can run Java applets. According to one embodiment, an e-purse is built on top of the global platform and implemented as an applet in SMX. The e-purse is configured to be able to access the Mifare data structures with appropriate transformed passwords based on the access keys.

In the cellphone 202, a purse manager midlet 204 is provided. For M-commerce, the midlet 204 acts as an agent to facilitate communications between an e-purse applet 206 and one or more payment network and servers 210 to conduct transactions therebetween. As used herein, a midlet is a software component suitable for being executed on a portable device. The purse manager midlet 204 is implemented as a "midlet" on a Java cellphone, or an "executable application" on a PDA device. One of the functions this software component provides is to connect to a wireless network and communicate with an e-purse applet which can reside on either the same device or an external smart card. In addition, it is configured to provide administrative functions such as changing a PIN, viewing a purse balance and a history log. In one application in which a card issuer provides a SA module 212 that is used to enable and authenticate any transactions between a card and a corresponding server (also referred to as a payment server). As shown in FIG. 2, APDU commands are constructed by the servers 210 having access to a SA module 212, where the APDU stands for Application Protocol Data Unit that is a communication unit between a reader and a card. The structure of an APDU is defined by the ISO 7816 standards. Typically, an APDU command is embedded in network messages and delivered to the server 210 or the e-purse applet 206 for processing.

For e-commerce, a web agent 214 on a computing device (not shown) is responsible for interacting with a RFID reader and the network server 210. In operation, the agent 214 sends the APDU commands or receives responses thereto through the RFID reader 216 to/from the e-purse applet 206 residing in the cellphone 202. On the other hand, the agent 214 composes network requests (such as HTTP) and receives responses thereto from the payment server 210.

Figure 3A:
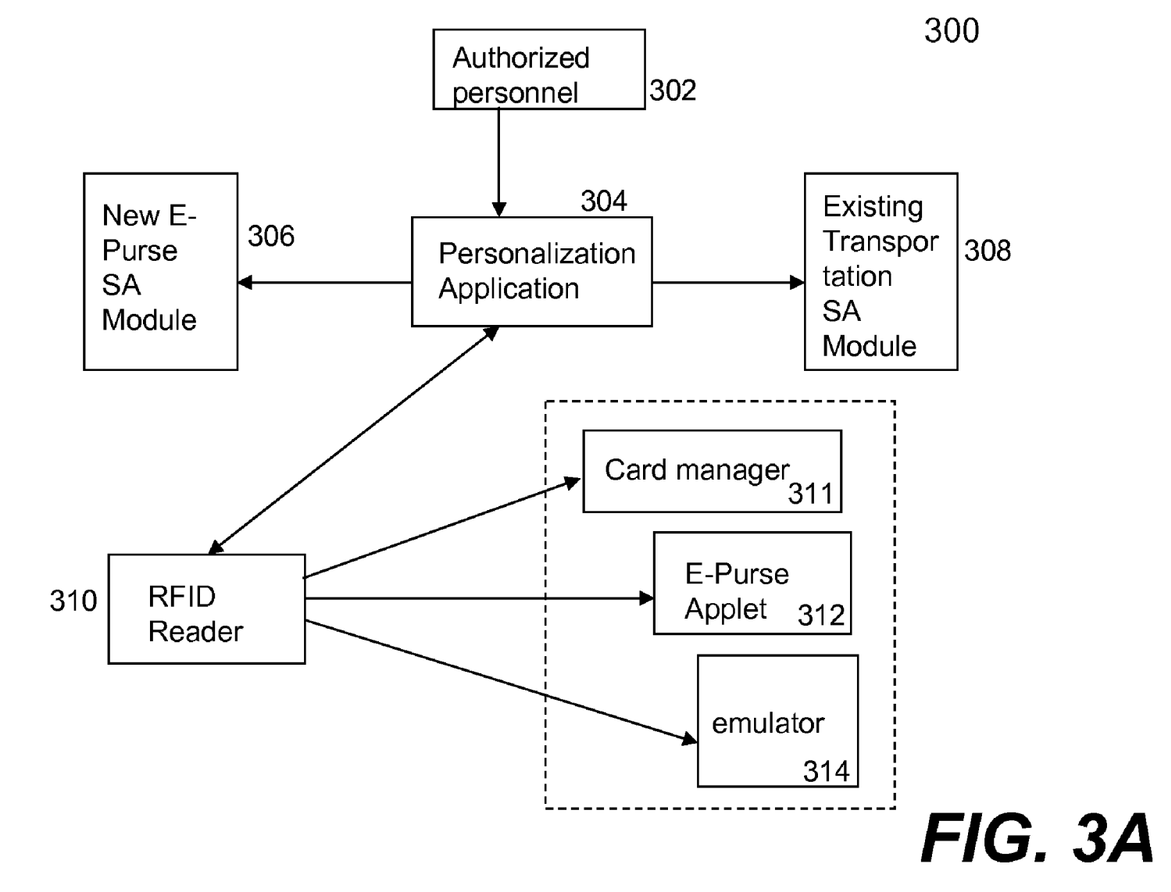
FIG. 3A a block diagram of related modules interacting with each other to achieve what is referred to herein as e-purse personalization by an authorized person as shown in FIG. 2.
Figure 3B:
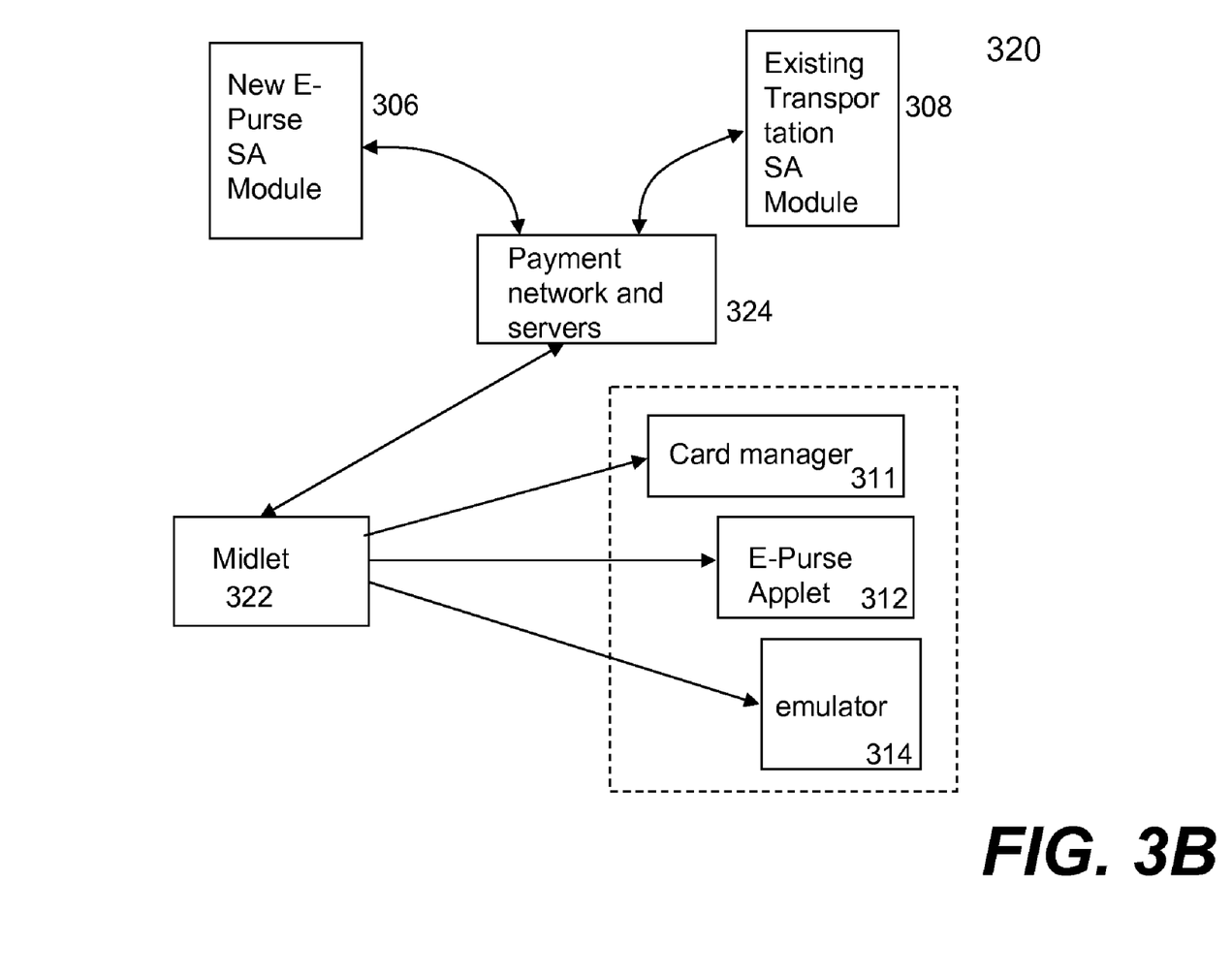
FIG. 3B shows a block diagram of related modules interacting with each other to achieve what is referred to herein as e-purse personalization by a user of the e-purse as shown in FIG. 2.

To personalize the cellphone 202, FIG. 3A shows a block diagram 300 of related modules interacting with each other to achieve what is referred to herein as e-purse personalization by an authorized person as shown in FIG. 2. FIG. 3B shows a block diagram 320 of related modules interacting with each other to achieve what is referred to herein as e-purse personalization by a user of the e-purse as shown in FIG. 2.

Figure 3C:
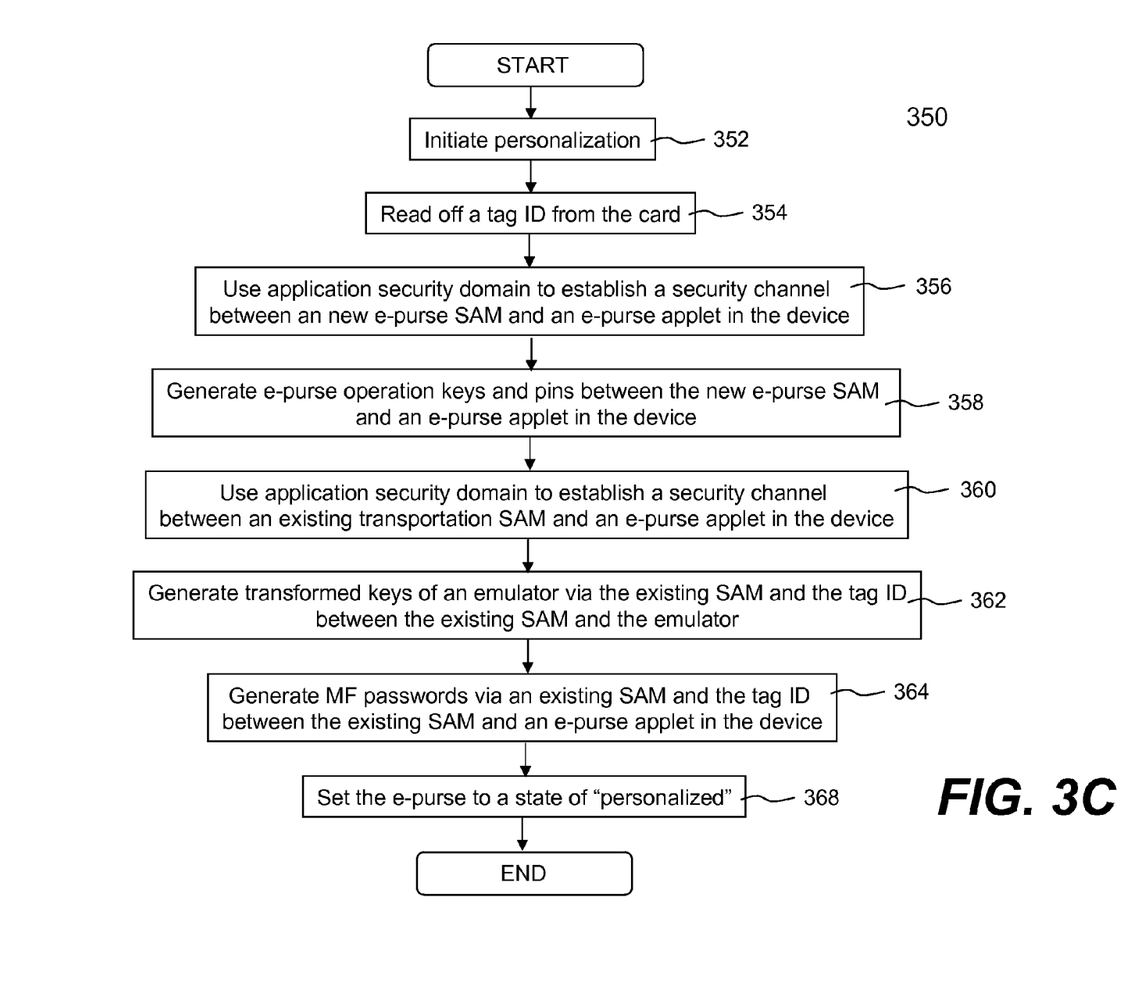
FIG. 3C shows a flowchart or process of personalizing an e-purse according to one embodiment of the present invention.

FIG. 3C shows a flowchart or process 350 of personalizing an e-purse according to one embodiment of the present invention. FIG. 3C is suggested to be understood in conjunction with FIG. 3A and FIG. 3B. The process 350 may be implemented in software, hardware or a combination of both.

As described above, an e-purse is built on top of a global platform to provide a security mechanism necessary to personalize applets designed therefor. In operation, a security domain is used for establishing a secured channel between a personalization application and the e-purse. According to one embodiment, the essential data to be personalized into the purse include one or more operation keys (e.g., a load key and a purchase key), default PINs, administration keys (e.g., an unblock PIN key and a reload PIN key), and passwords (e.g., from Mifare).

It is assumed that a user desires to personalize an e-purse embedded in a device (e.g., a cellphone). At 352 of FIG. 3C, a personalization process is initiated. Depending on implementation, the personalization process may be implemented in a module in the device and activated manually or automatically, or a physical process initiated by an authorized person (typically associated with a care issuer). As shown in FIG. 3A, an authorized personal initiates a personalization process 304 to personalize the e-purse for a user thereof via new e-purse SA module 306 and an existing SA module 308 with the RFID reader 310 as the interface. The card manager 311 performs at least two functions: 1. establishing a security channel, via a security domain, to install and personalize an external application (e.g., e-purse applet) in the card personalization; and 2. creating security means (e.g., PINs) to protect the application during subsequent operations. As a result of the personalization process 304, the e-purse applet 312 and the emulator 314 are personalized.

Similarly, as shown in FIG. 3B, a user of an e-purse desires to initiate a personalization process to personalize the e-purse wirelessly (e.g., via the m-commerce path of FIG. 2). Different from FIG. 3A, FIG. 3B allows the personalization process to be activated manually or automatically. For example, there is a mechanism on a cellphone that, if pressed, activates the personalization process. Alternatively, a status of "non-personalized" may prompt to the user to start the personalization process. As described above, a midlet 322 in a device acts as an agent to facilitate the communication between a payment server 324 and the e-purse 312 as well as the emulator 314, wherein the payment server 324 has the access to the new e-purse SA module 306 and an existing SA module 308. As a result of the personalization process, the e-purse applet 312 and the emulator 314 are personalized.

Referring now back to FIG. 3C, after the personalization process is started, in view of FIG. 3A, the RFID reader 310 is activated to read the tag ID and essential data from a card in the device at 354. With an application security domain (e.g., a default security setting by a card issuer), a security channel is then established at 356 between a new e-purse SAM (e.g., the SAM 306 of FIG. 3A) and an e-purse applet (e.g., the e-purse applet 312 of FIG. 3A) in the device.

Each application security domain of a global platform includes three 3DES keys. For example:
Key1: 255/1/DES-ECB/4041424344454647484944a4b4c4d4e4f
Key2: 255/2/DES-ECB/4041424344454647484944a4b4c4d4e4f
Key3: 255/3/DES-ECB/4041424344454647484944a4b4c4d4e4f A security domain is used to generate session keys for a secured session between two entities, such as the card manager applet and a host application, in which case the host application may be either a desktop personalization application or a networked personalization service provided by a backend server.

A default application domain can be installed by a card issuer and assigned to various application/service providers. The respective application owner can change the value of the key sets before the personalization process (or at the initial of the process). Then the application can use the new set to create a security channel for performing the personalization process.

With the security channel is established using the application provider's application security domain, the first set of data can be personalized to the purse applet. The second set of data can also be personalized with the same channel, too. However, if the data are in separate SAM, then a new security channel with the same key set (or different key sets) can be used to personalize the second set of data.

Via the new purse SAM 306, a set of e-purse operation keys and pins are generated for data transactions between the new e-purse SAM and the e-purse applet to essentially personalize the e-purse applet at 358.

A second security channel is then established at 360 between an existing SAM (e.g., the SAM 308 of FIG. 3A) and the e-purse applet (e.g., the e-purse applet 312 of FIG. 3A) in the device. At 362, a set of transformed keys is generated using the existing SAM and the tag ID. The generated keys are stored in the emulator for subsequent data access authentication. At 358, a set of MF passwords is generated using the existing SAM and the tag ID, then is stored into the e-purse applet for future data access authentication. After it is done, the e-purse including the e-purse applet and the corresponding emulator is set to a state of "personalized".

Figure 4A:
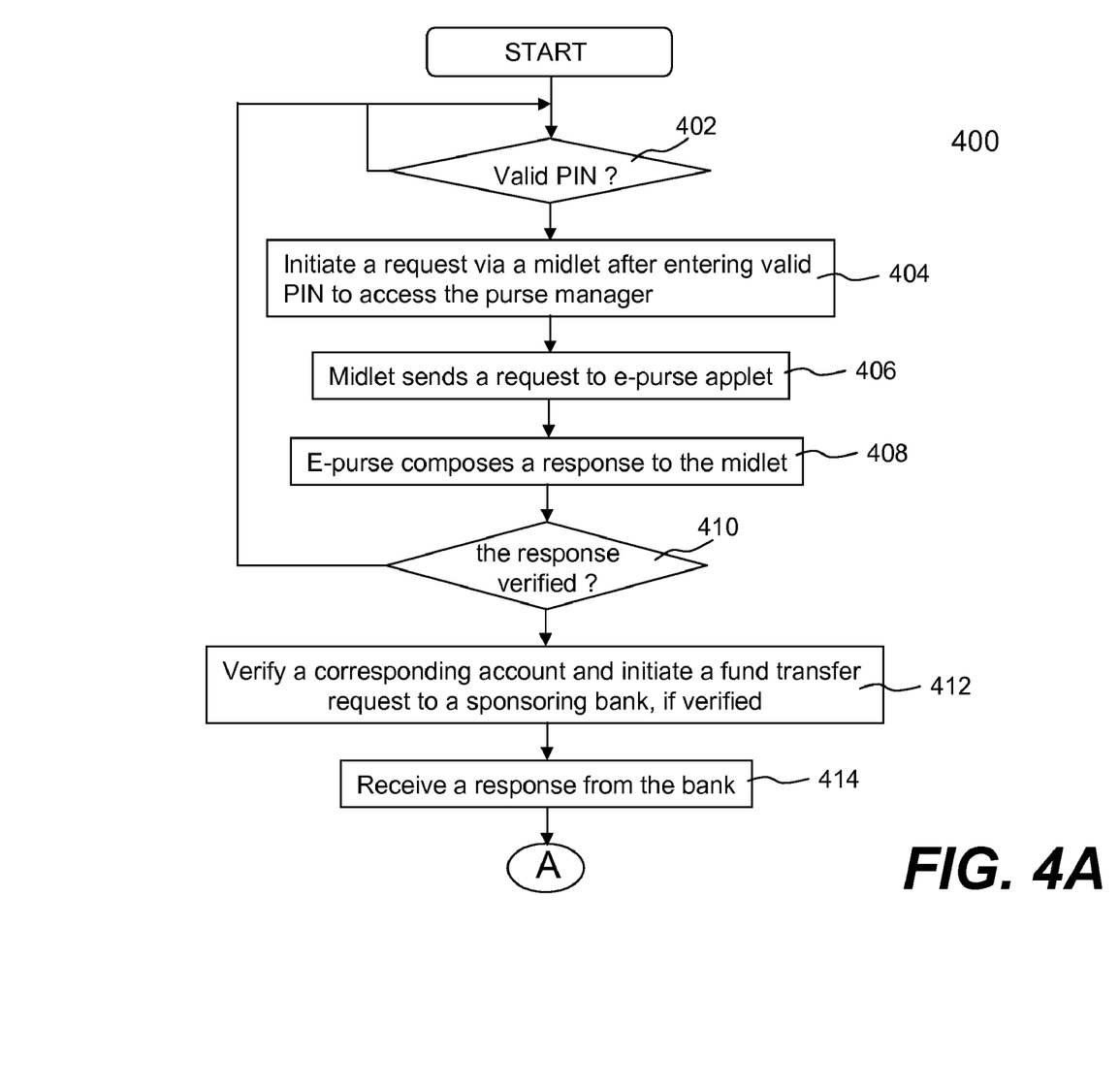
FIG. 4A and FIG. 4B show together a flowchart or process of financing an e-purse according to one embodiment of the present invention.
Figure 4B:
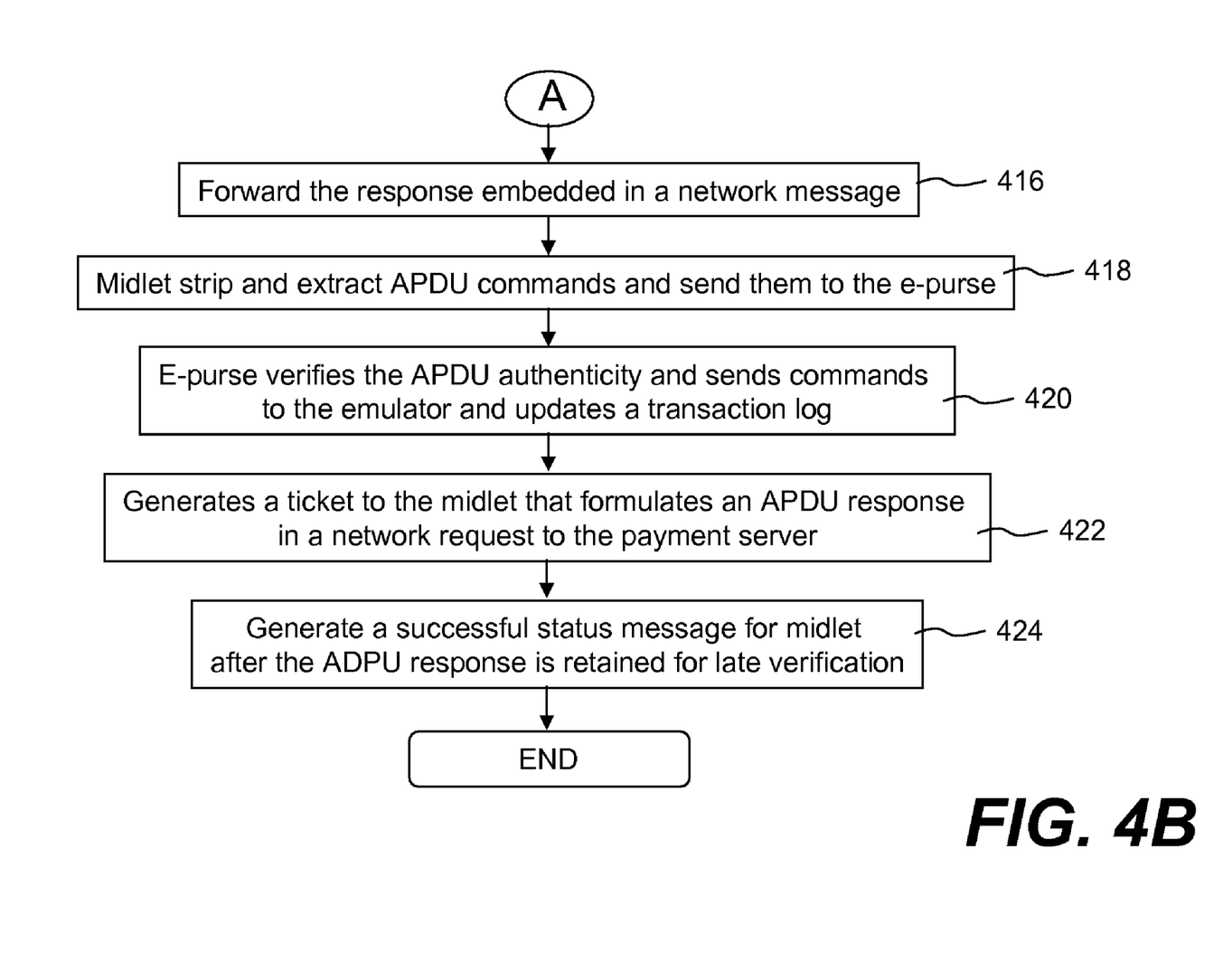
Figure 4C:
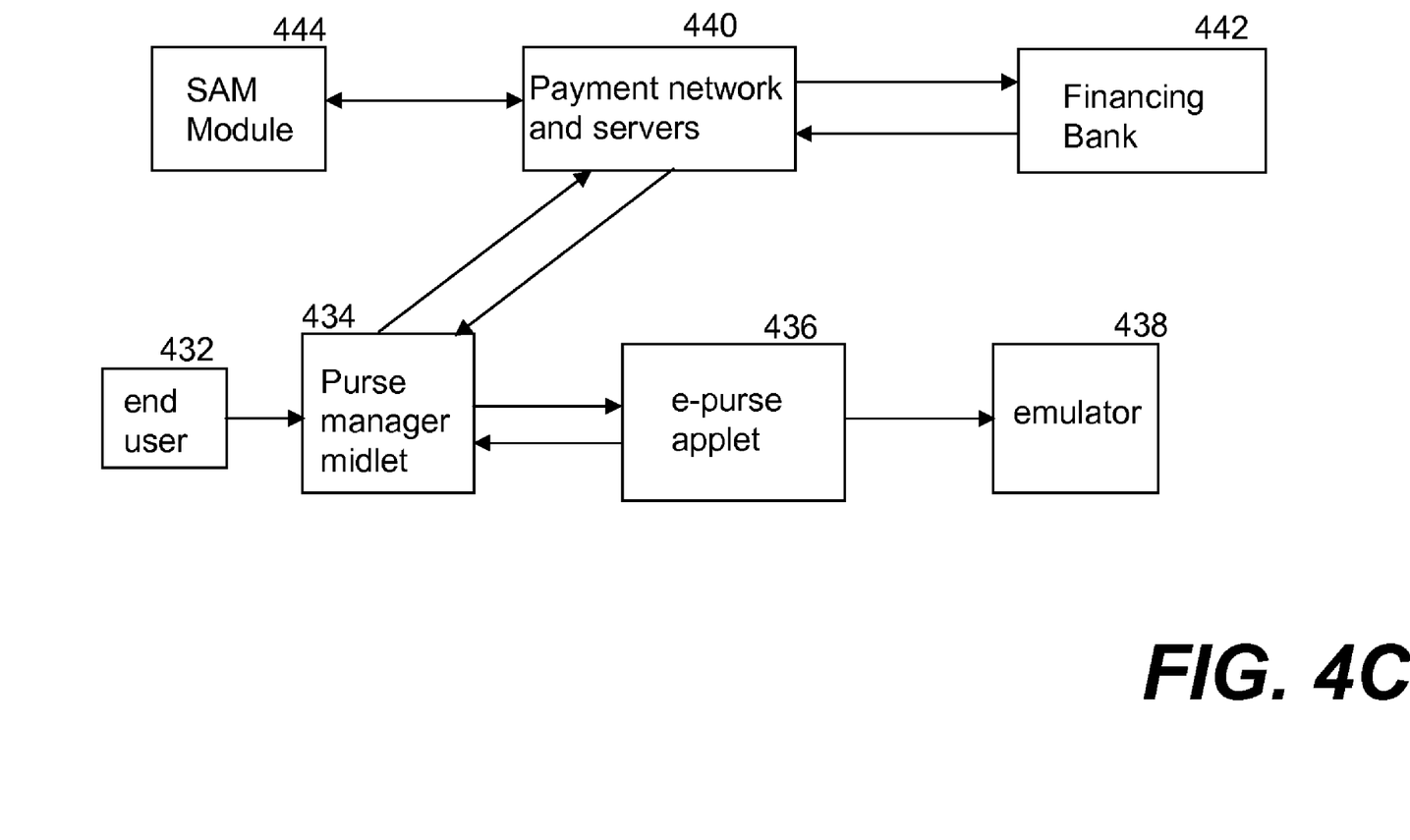
FIG. 4C shows an exemplary block diagram of related blocks interacting with each other to achieve the process FIG. 4A.

FIG. 4A and FIG. 4B show together a flowchart or process 400 of financing an e-purse according to one embodiment of the present invention. The process 400 is conducted via the m-commerce path of FIG. 2. To better understand the process 400, FIG. 4C shows an exemplary block diagram 450 of related blocks interacting with each other to achieve the process 400. Depending on an actual application of the present invention, the process 400 may be implemented in software, hardware or a combination of both.

A user is assumed to have obtained a portable device (e.g., a cellphone) that is configured to include an e-purse. The user desires to fund the e-purse from an account associated with a bank. At 402, the user enters a set of personal identification numbers (PIN). Assuming the PIN is valid, a purse manger in the device is activated and initiates a request (also referred to an OTA top off request) at 404. The midlet in the device sends a request to the e-purse applet at 406, which is illustrated in FIG. 4C where the e-purse manager midlet 434 communicates with the e-purse applet 436.

At 408, the e-purse applet composes a response in responding to the request from the midlet. Upon receiving the response, the midlet sends the response to a payment network and server over a wireless network. As shown in FIG. 4C, the e-purse manager midlet 434 communicates with the e-purse applet 436 for a response that is then sent to the payment network and server 440. At 410, the process 400 needs to verify the validity of the response. If the response can not be verified, the process 400 stops. If the response can be verified, the process 400 moves to 412 where a corresponding account at a bank is verified. If the account does exist, a fund transfer request is initiated. At 414, the bank receives the request and responds to the request by returning a response. In general, the messages exchanged between the payment network and server and the bank are compliant with a network protocol (e.g., HTTP for the Internet).

At 416, the response from the bank is transported to the payment network and server. The midlet strips and extracts the APDU commands from the response and forward the commands the e-purse at 418. The e-purse verifies the commands at 420 and, provided they are authorized, send the commands to the emulator at 420 and, meanwhile updating a transaction log. At 422, a ticket is generated to formulate a response (e.g., in APDU format) for payment server. As a result, the payment server is updated with a successful status message for the midlet, where the APDU response is retained for subsequent verification at 424.

As shown in FIG. 4C, the payment network and server 440 receives a response from the purse manager midlet 434 and verifies that the response is from an authorized e-purse originally issued therefrom with a SAM module 444. After the response is verified, the payment network and server 440 sends a request to the financing bank 442 with which the user 432 is assumed to maintain an account. The bank will verify the request, authorize the request and return an authorization number in some pre-arranged message format. Upon receiving the response from bank, the server 440 will either reject the request or form a network response to be sent to the midlet 434.

The e-purse verifies the authenticity (e.g., in APDU format) and sends commands to the emulator 438 and updates the transaction logs. By now, the e-purse finishes the necessary steps and returns a response to the midlet 434 that forwards an (APDU) response in a network request to the payment server 440.

Although the process 400 is described as funding the e-purse. Those skilled in the art can appreciate that the process of making purchasing over a network with the e-purse is substantially similar to the process 400, accordingly no separate discussion on the process of making purchasing is provided.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiment.

We claim:

1. A method for providing an e-purse, the method comprising:

providing a portable device including or communicating with a smart card pre-loaded with an emulator configured to execute a request from an e-purse applet and provide a response the e-purse applet is configured to expect, the portable device including a memory space loaded with a midlet that is configured to facilitate communication between the e-purse applet and a payment server over a wireless network, wherein the e-purse applet is downloaded and installed in the smart card when the smart card is in communication with the payment server, the portable device further includes a contactless interface that facilitates communication between the e-purse applet in the smart card and the payment server over a wired network;

personalizing the e-purse applet by reading off data from the smart card to generate in the smart card one or more operation keys that are subsequently used to establish a secured channel between the e-purse applet and an e-purse security authentication module (SAM) external to the smart card, wherein said personalizing the e-purse applet comprises:

establishing an initial security channel between the smart card and the e-purse SAM to install and personalize the e-purse applet in the smart card, and creating a security channel on top of the initial security channel to protect subsequent operations of the smart card with the e-purse SAM, wherein any subsequent operation of the emulator is conducted over the security channel via the e-purse applet.

2. The method as recited in claim 1, wherein the operation keys include one or more of a load key and a purchase key, default personal identification numbers (PINs), administration keys, and passwords.

3. The method as recited in claim 2, wherein at least some of the operation keys are used to establish a first secured channel so that various data is exchanged between the e-purse applet and the payment server, and at least another some of the operation keys are used to establish a second secured channel so that various data is exchanged between the e-purse applet and the e-purse SAM originally used to issue the e-purse as well as between the emulator and the existing SAM.

4. The method as recited in claim 2, wherein said personalizing the e-purse applet is done over a wireless network or a wired network.

5. The method as recited in claim 4, wherein, when said personalizing the e-purse applet is done over a wireless network, the midlet in the portable device is configured to facilitate communications between the e-purse and the payment server.

6. The method as recited in claim 5, wherein both of the e-purse applet and the emulator are personalized as a result of said personalizing the e-purse applet.

7. The method as recited in claim 1, further comprising:
initiating a request from the e-purse after valid personal identification numbers are entered and accepted on the portable device;
sending a request by the midlet to the e-purse applet that is configured to compose a response to be sent to the midlet;
transporting the response to the payment server that is configured to verify that the response is from an authenticated e-purse, wherein the payment server further communicates with a financial institution to authorize a transaction therewith; and
sending a server response from the payment server to the midlet that is configured to process the server response before releasing the server response to the e-purse applet.

8. The method as recited in claim 7, wherein messages exchanged between the midlet and the payment server are in a type of commands encapsulated in network messages.

9. The method as recited in claim 8, wherein the commands are applicable for APDU which stands for Application Protocol Data Unit.

10. The method as recited in claim 1, wherein the e-purse is funded through a financial institution that maintains an account for a user being associated with the portable device, and the e-purse supports transactions in either e-commerce or m-commerce.

11. A system for providing an e-purse, the system comprising:
a portable device including or communicating with a smart card pre-loaded with an emulator configured to execute a request from and provide a response an e-purse applet is configured to expect, the portable device including a memory space loaded with a midlet that is configured to facilitate wireless communication between the e-purse applet in the smart card and a payment server over a wireless network, the portable device further including a contactless interface that facilitates communication between the e-purse applet in the smart card and the payment server over a wired network, wherein the e-purse applet is downloaded from the payment server when the smart card is in communication with the payment server, and operations of personalizing the e-purse applet comprises:
establishing an initial security channel between the smart card and the e-purse security authentication module (SAM) to install and personalize the e-purse applet in the smart card, and
creating a security channel on top of the initial security channel to protect subsequent operations of the smart card with the e-purse SAM, wherein any subsequent operation of the emulator is conducted over the security channel via the e-purse applet;
the payment server associated with an issuer authorizing the e-purse applet; and
the e-purse SAM configured to enable the e-purse applet, wherein an SAM is behind the payment server and in communication with the e-purse applet when the e-purse applet is caused to communicate with the payment server via the midlet.

12. The system as recited in claim 11, wherein both of the e-purse applet and emulator are personalized by reading off data from the smart card, the data is then used to generate operation keys for the e-purse applet.

13. The system as recited in claim 12, wherein the operation keys include one or more of a load key and a purchase key, default personal identification numbers (PINs), administration keys, and passwords.

14. The system as recited in claim 13, wherein at least some of the operation keys are used to establish a first secured channel so that various data is exchanged between the e-purse applet and the payment server, and at least another some of the operation keys are used to establish a second secured channel so that various data is exchanged between the e-purse applet and an existing security authentication module (SAM) originally used to issue the e-purse as well as between the emulator and the existing SAM.

15. The system as recited in claim 11, wherein, when the portable device is used to have a transaction, there are operations of:
initiating a request from the e-purse after valid personal identification numbers are entered and accepted on the portable device;
sending a request by the midlet to the e-purse applet that is configured to compose a response to be sent to the midlet;
transporting the response to the payment server that is configured to verify that the response is from an authenticated e-purse, wherein the payment server further communicates with a financial institution to authorize a transaction therewith; and
sending a server response from the payment server to the midlet that is configured to process the server response before releasing the server response to the e-purse applet.

16. The system as recited in claim 15, wherein messages exchanged between the midlet and the payment server are in a type of commands encapsulated in network messages.

17. The system as recited in claim 16, wherein the commands are applicable for APDU which stands for Application Protocol Data Unit.

18. The system as recited in claim 11, wherein the e-purse is funded through a financial institution that maintains an account for a user being associated with the portable device.

* * * * *